(12) United States Patent
Schubetzer

(10) Patent No.: US 8,732,953 B2
(45) Date of Patent: May 27, 2014

(54) ASSEMBLING PANELS EDGE TO EDGE

(75) Inventor: Geneviève Schubetzer, Colomiers (FR)

(73) Assignee: Airbus Operations SAS, Toulouse (FR)

( * ) Notice: Subject to any disclaimer, the term of this patent is extended or adjusted under 35 U.S.C. 154(b) by 724 days.

(21) Appl. No.: 12/402,788

(22) Filed: Mar. 12, 2009

(65) Prior Publication Data

US 2009/0229105 A1   Sep. 17, 2009

(30) Foreign Application Priority Data

Mar. 12, 2008   (FR) ...................... 08 51622

(51) Int. Cl.
    *B21D 53/88* (2006.01)
(52) U.S. Cl.
    USPC ........................................ 29/897.2
(58) Field of Classification Search
    USPC ........................................ 29/897.2
    See application file for complete search history.

(56) References Cited

U.S. PATENT DOCUMENTS

| | | |
|---|---|---|
| 3,825,360 A | 7/1974 | Galich |
| 5,052,158 A | 10/1991 | D'Luzansky |

FOREIGN PATENT DOCUMENTS

| | | |
|---|---|---|
| DE | 25 47 637 A1 | 4/1977 |
| FR | 2 148 079 A | 3/1973 |
| WO | WO 03/067099 A1 | 8/2003 |

*Primary Examiner* — David Bryant
*Assistant Examiner* — Moshe Wilensky
(74) *Attorney, Agent, or Firm* — Patterson Thuente Pedersen, P.A.

(57) ABSTRACT

A method of edge to edge assembly of panels. The method generally includes performing male and female matching cuts on the panel edges to be assembled next to each other, and assembling the panels edge to edge so that the male protuberances of one panel are inserted in the matching female cavities of the second panel, and vice-versa. Such method is applicable to aircraft and automobile manufacturing for the assembly of thin structures, primary or secondary, such as fuselage panels, airfoils, cabin and cockpit paneling, etc., and can be used for metallic as well as composite panels.

5 Claims, 1 Drawing Sheet

ASSEMBLING PANELS EDGE TO EDGE

RELATED APPLICATION

The present application claims priority to French Application No. 08 51622 filed Mar. 12, 2008, which is incorporated herein in its entirety by reference.

FIELD OF THE INVENTION

The invention relates to a method of edge to edge assembly of panels. The invention is, in particular, applicable to aircraft and automobile manufacturing for the assembly of thin structures, primary or secondary, such as fuselage panels, airfoils, cabin and cockpit paneling, etc. According to embodiments of the invention, the method can be used for metallic as well as composite panels.

BACKGROUND OF THE INVENTION

The current practice is to assemble panels by means of fasteners such as rivets, screws, nuts and bolts etc. This traditional assembly method by fasteners has a tendency to increase the total mass of the assembly. Moreover, installing these fasteners increases the assembly time required. In the case of composite materials, the use of these fasteners eliminates for the most part the advantages of the composite construction. Actually, in addition to the increased weight due to the fasteners, inasmuch as they are generally made of metal, the composite panels become susceptible of corrosion and fatigue just like metallic panels.

Panels can also be assembled by welding, e.g. laser welding. But this assembly method is only applicable to metallic panels.

SUMMARY OF THE INVENTION

Embodiments of the invention seek to provide an assembly method which can be used either on metallic or composite panels, or to assemble a metallic panel and a composite panel together.

Embodiments of the invention also provide an assembly method which does not sensibly increase the mass of the assembly beyond that of the panels themselves.

To this end, embodiments of the invention are directed to assembling the panels like jigsaw puzzle pieces. The edges of the panels are cut in such a way as to present male and female matching elements which can be inserted one into the other. For example, a male protuberance on the edge of one panel fits into a female cavity in the edge of the other panel. The panel edges featuring male and female matching elements, respectively, are brought together in such a way that the male elements lodge themselves in the female elements. The assembly operation is thus reduced to quickly fitting the edges to each other. The cost is reduced further since no additional fasteners are used. In the field of aerodynamics, such a panel assembly method also reduces drag since the overlapping of panels is no longer necessary. It is understood that in the case of metallic panels or panels with a metallic component, the male and female elements of the panel edges can be cut and the panels assembled at the same temperature, in order to avoid thermal expansion problems. The assembly method according to embodiments of the invention also allows the use of large dimension sheets which need not be cut to the desired size until the last moment. This improves the assembly tolerances, the panel thickness being the only dimension to be fixed in advance.

Thus, the subject of the invention is an edge to edge panel assembly method, the method including:
performing the male and female matching cuts on the panel edges to be assembled next to each other;
assembling the panels edge to edge so that the male protuberances of one panel are inserted or received in the matching female cavities of the second panel, and vice-versa.

The cutting of the male and female elements on the panel edges can be done by laser or water jet for example.

According to some embodiments of the invention, it is possible to implement the method with the following feature: a bevel cut is made on the thickness of panel edges to be assembled, before or after the male and female elements are cut. Thickness is defined as the dimension which is perpendicular to the plane of the panels. The panels are then joined together for assembly. This bevel cut allows a larger contact area between the edges of the panels and thus a better transmission of forces.

The bevel angle can be a maximum of about 45°. The bevel angle is defined as the smaller of the two angles formed by the bevel. Smaller angles lead to a potential separation of the composite layers, and in all cases, increase the risk of blunting of the bevel.

Similarly, the following feature could allow the strengthening of the assembly: means of securing the assembly are attached to the interior side of the panels. The interior side of the panels is the side towards the interior of the structure covered by the panels, so that no detrimental drag is created on the exterior side. The means of securing the assembly can be standard fasteners, rivets etc.

The means of securing the assembly can comprise lugs attached to the inside of the panels placed along the edges to be joined, and at least one bar to be held between the aforementioned lugs. The lugs are disposed along the edges to be joined so that they protrude towards the exterior of the panel edge.

Once the panels are assembled, the bar can slide between the lugs along the joined panel edges. The lugs on both edges are not necessarily facing each other, they may be staggered. Furthermore, the bar can be a single bar along the length of the panel joints, or a portion thereof, or broken into several shorter bars following each other.

The lugs can be molded into the interior side of the panels. But the lugs can obviously be welded or glued or affixed to the panels by any other known means. The assembly method according to embodiments of the invention can be used whether the two panels are metallic, composite, or one panel is metallic and the other of composite material to form a hybrid joint.

The assembly method according to embodiments of the invention allow the use of panels that are wider and/or longer than the dimensions required after assembly with only the thickness being predetermined, as opposed to a method whereby all dimensions must be determined before assembly, leaving no margin for error. On the contrary, the assembly method according to the invention affords a larger tolerance at the time of assembly.

Length and width of the panels are defined as the dimensions along the edges of the said panels, and the edges are deemed to be perpendicular to each other.

BRIEF DESCRIPTION OF THE DRAWINGS

The invention shall be better understood after reading the following description and examining the accompanying figures. These are presented as illustration and in no way limit the scope of the invention. The figures show.

DETAILED DESCRIPTION OF THE DRAWINGS

Figure 1:
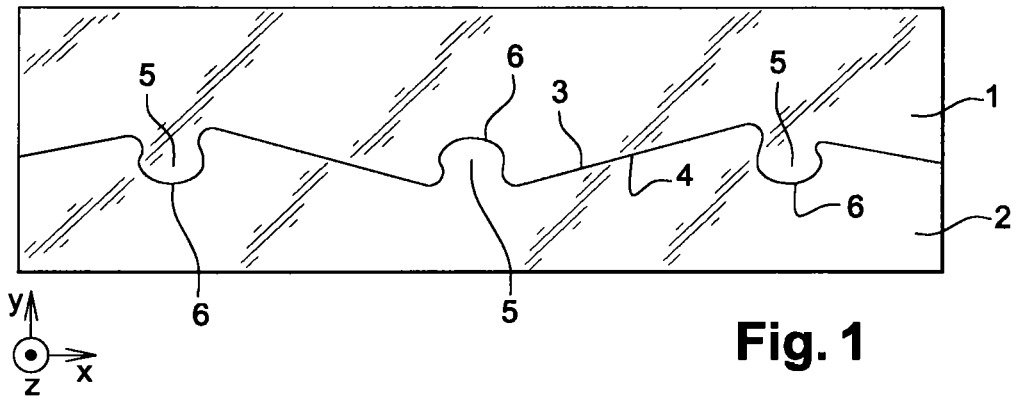
FIG. 1 is a partial frontal view depicting two panels assembled according to a first embodiment of the invention.
Figure 2:
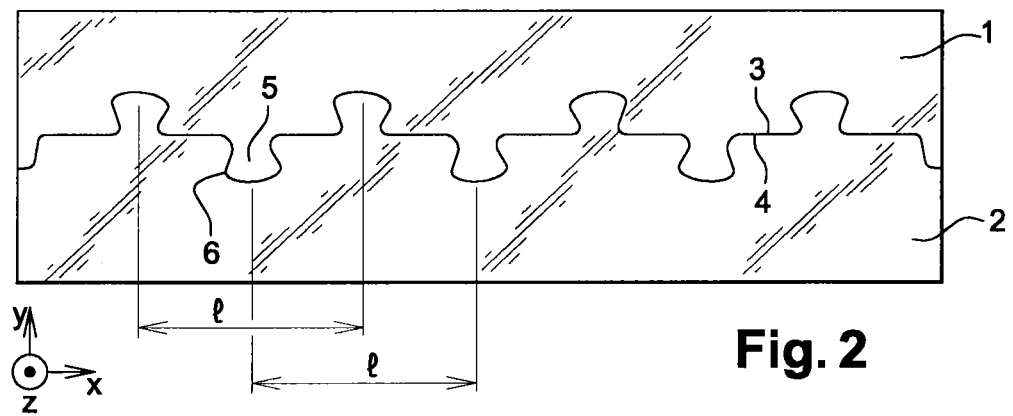
FIG. 2 is a partial frontal view depicting two panels assembled according to a second embodiment of the invention.

FIGS. 1 and 2 illustrate two panels 1 and 2 at the vicinity of their joined edges 3 and 4.

Prior to assembly of panels 1 and 2, their edges 3 and 4 have been cut, such as, for example, laser cut, so that they feature matching male 5 and female 6 elements. Matching is defined as one male protuberance 5 on either edge 3 or 4 of panel 1 or 2 has a shape and dimension such that it fits into one female cavity 6 on the other of edge 3 or 4 of joined panel 1 or 2. The dimensions of male protuberance 5 are exactly the same as those of female cavity 6, so that it provides a snug fit. Panels 1 and 2 are thus assembled like jigsaw puzzle pieces.

In order to standardize the assembly process according to embodiments of the invention, and to join together any panels 1 and 2 edge to edge, it is possible to systematically cut both male 5 and female 6 elements alternatively into each edge 3 and 4 of panels 1 and 2 to be joined; two male protuberances being at a distance l from each other and separated by a female cavity, two female cavities also being at a distance l from each other, as illustrated in FIG. 2. It is of course possible to dispose the male 5 and female 6 elements differently, or to place all male 5 elements on one panel and all the matching female 6 elements on the other panel, or any other permutation.

Figure 3:
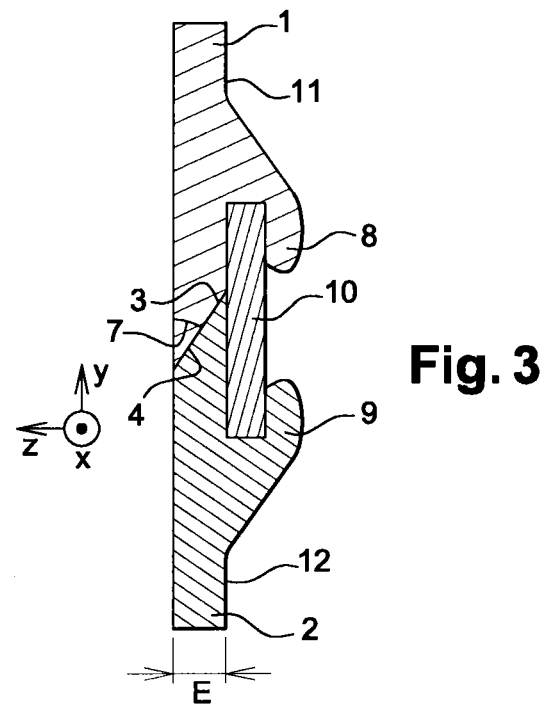
FIG. 3 is a partial schematic cross section depicting two panels assembled by using the method according to the invention.

As illustrated in FIG. 3, a bevel cut is possible in the thickness E of edges 3 and 4 of panels 1 and 2 to be joined, before the assembly of panels 1 and 2 together. A bevel cut is an angle cut at edges 3 and 4 of panel 1 and 2 in thickness E of the panels to be joined, so as to increase the contact area between edges 3 and 4 of panels 1 and 2. Thickness is defined as the dimension which is perpendicular to the plane of the panels. The bevel angle 7 can be a maximum of about 45°. In effect, one must strike a balance between a maximal contact area and the risk of blunting the angle and, and for composites, the risk of separation of the layers at the cut edge.

It is also possible, as illustrated in FIG. 3, to provide lugs 8 and 9 on panels 1 and 2 between which a bar 10 can be installed. More precisely, lugs 8 and 9 are provided on interior faces 11 and 12 of the panels 1 and 2 in the form of protuberances with hook reaching towards the outside of the edge of panels 1 and 2. The hooks of lugs 8 on first panel 1 reach towards second panel 2, and the hooks of lugs 9 on second panel 2 reach towards first panel 1, so as to form a slide in which bar 10 is held in position. Bar 10 prevents any movement of panels 1 and 2 with respect to each other.

In another embodiment, it is possible to hold the bar 10 against panels 1 and 2 by welding or gluing, depending on the nature of panels 1 and 2 assembly material(s).

The bevel angle and bar 10 can be used independently. It is also possible to make bar 10 an integral part of panels 1 and 2, but in this case, the assembly method according to embodiments of the invention loses some flexibility.

The invention claimed is:

1. A method of assembling fuselage or primary structural aircraft rigid panels edge to edge, the method comprising:
   providing at least a first rigid panel presenting a first rigid panel edge and a second rigid panel presenting a second rigid panel edge;
   cutting male and female matching elements on the first and second rigid panel edges to be assembled next to each other, wherein the male elements comprise protuberances, and the female elements comprise cavities;
   forming a first bevel cut on the first rigid panel edge and a second bevel cut on the second rigid panel edge complementary to the first bevel cut before or after the male and female matching elements are cut, wherein the first and second bevel cuts each define a beveled edge of no more than 45 degrees from a plane of the first and second rigid panels;
   assembling the at least first and second rigid panels edge to edge so that the male protuberances of the first rigid panel are inserted in the matching female cavities of the second rigid panel, and vice-versa.

2. The method according to claim 1, wherein the first rigid panel has an first inwardly facing interior face and first opposed outwardly facing exterior face and the second rigid panel has an second inwardly facing interior face and second opposed outwardly facing exterior face, further comprising:
   forming the first and second rigid panels to include at least a first lug protruding inwardly from the first interior face and a second lug protruding inwardly from the second interior face, the first and second lugs recessed from the first and second panel edges, wherein the first and second lugs create a cavity for receiving a sliding bar, one edge of the cavity defined by the first and second interior faces; and
   securing the first and second rigid panels in position with respect to each other by inserting a sliding bar into the cavity.

3. The method according to claim 1, wherein the rigid panels to be assembled are made of at least one of metallic and composite materials.

4. The method according to claim 1, wherein each of the at least first and second rigid panels present at least one of a rigid panel width and a rigid panel length before assembly that is larger than after assembly, and a panel thickness that is substantially equal before and after assembly.

5. The method according to claim 1, wherein the first bevel cut is continuous along the male and female elements of the first rigid panel edge and the second bevel cut is continuous along the male and female elements of the second rigid panel edge, the second bevel cut being complementary to the first bevel cut.

* * * * *